Figure 1:
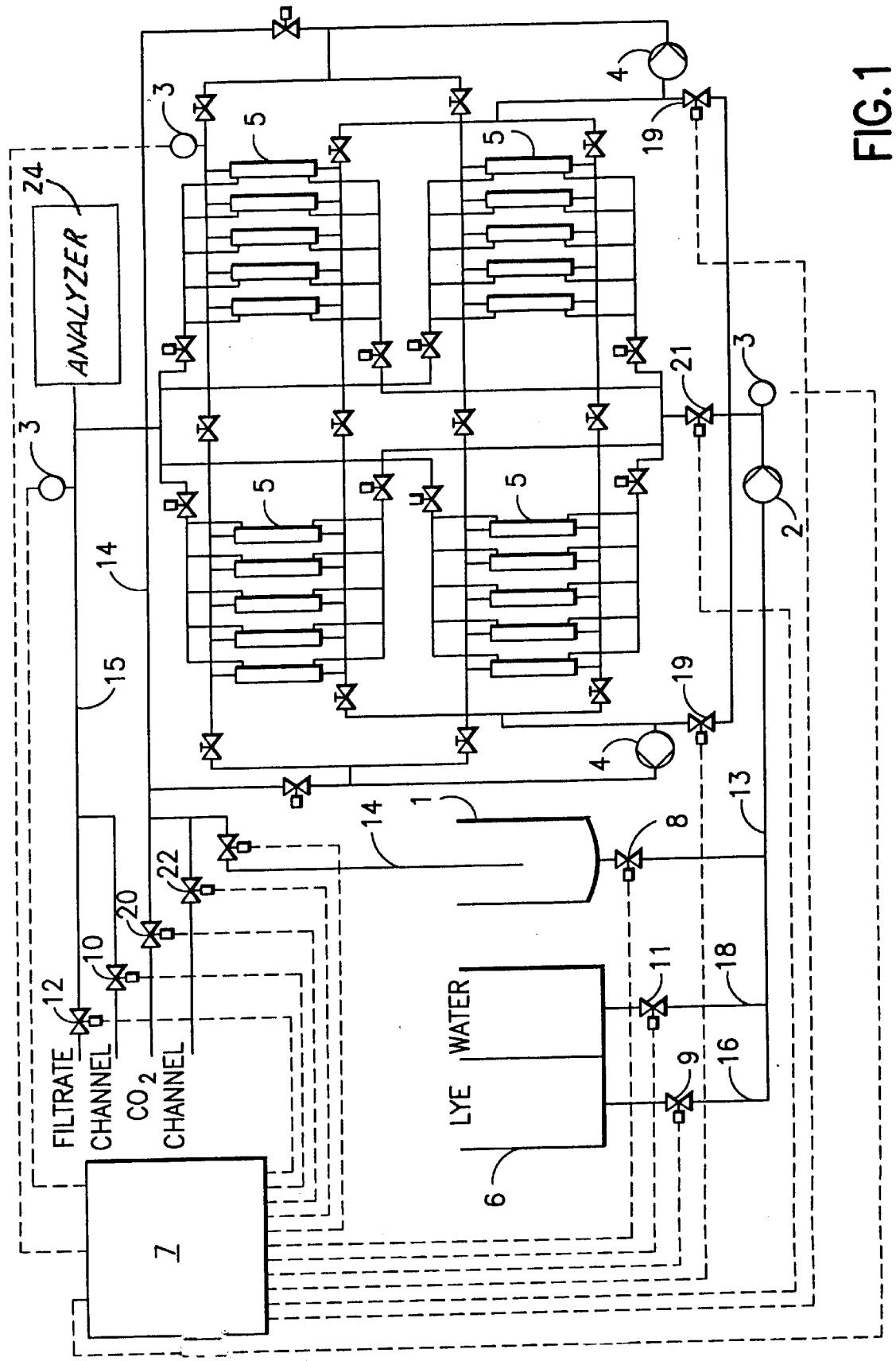

United States Patent [19]

Strohm et al.

[11] Patent Number: 6,139,724
[45] Date of Patent: Oct. 31, 2000

[54] PROCEDURE AND DEVICE FOR FILTRATION OF FLUIDS USING MF MODULES

[75] Inventors: Gerhard Strohm, Dexheim; Georg Schnieder, Traisen; Wolfgang Hepp, Alzey; Paul Duckek, Gutenberg, all of Germany

[73] Assignee: Seitz-Filter-Werke GmbH und Co., Bad Kreuznach, Germany

[21] Appl. No.: 09/255,500

[22] Filed: Feb. 23, 1999

Related U.S. Application Data

[63] Continuation-in-part of application No. 08/619,214, Mar. 21, 1996, Pat. No. 5,879,557.

[51] Int. Cl.[7] .................................................. B01D 61/22
[52] U.S. Cl. ........................... 210/85; 210/90; 210/96.2; 210/106; 210/321.69; 210/636; 210/93; 426/495
[58] Field of Search .............................. 210/85, 90, 96.2, 210/106, 108, 143, 321.69, 636, 651, 739, 741, 93, 743; 426/12, 14, 16, 330.4, 495, 592; 99/277.1

[56] References Cited

U.S. PATENT DOCUMENTS 4,724,080 2/1988 Dau .......................................... 210/651
4,844,932 7/1989 Daoud ...................................... 426/495
5,066,402 11/1991 Anselm et al. ......................... 210/636

OTHER PUBLICATIONS

More than Two Years of Practical Experience with Tangential Flow Filtration for Beer Recovery from Spent Yeast, Wolfgang Muller, MBAA Quarterly, vol. 29, pp. 42–47, 1992.

*Primary Examiner*—Joseph W. Drodge
*Attorney, Agent, or Firm*—H. Gibner Lehmann; K. Gibner Lehmann

[57] ABSTRACT

A process is described for filtration of fluids, particularly of heterodisperse fluids like beer, in which a cleaning cycle of the MF modules is always carried out when the transmembrane pressure exceeds a pre-set pressure which has been selected to be equal to the optimal trans-membrane pressure for the particular fluid to be filtered as regards its analytical appearance. In beer filtration this value is preferably set at 1.5 bar. The microfiltration facility is equipped with numerous MF modules 5, arrayed in series and parallel; with a device for cleansing the MF modules 5; and with a measuring device 3 for recording trans-membrane pressure, attached to a control device 7, which, upon attaining the pre-set trans-membrane pressure, interrupts the filtration process and starts a cleansing cycle going.

3 Claims, 4 Drawing Sheets

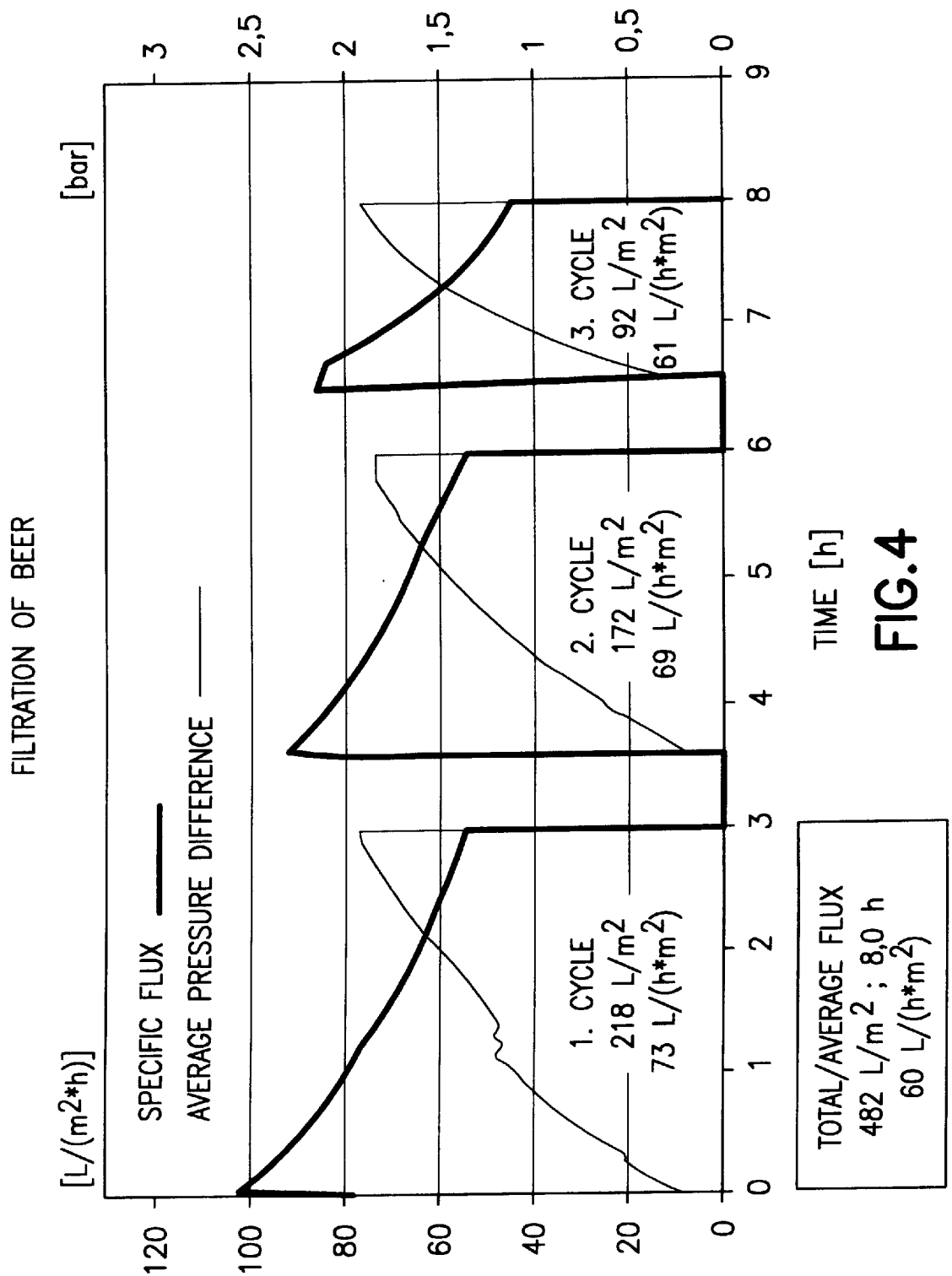

PROCEDURE AND DEVICE FOR FILTRATION OF FLUIDS USING MF MODULES

The present invention is a continuation-in-part of application U.S. Ser. No. 08/619,214 Mar. 21, 1996, now U.S. Pat. No. 5,879,557.

DESCRIPTION

The invention has to do with a procedure for filtration of fluids, particularly of heterodisperse suspensions like beer, using MF modules in which filtration cycles alternate with cleansing cycles, and during filtration the trans-membrane pressure is measured constantly.

Although the filtration process is applicable to any fluids, treatment of worts, green beer or aged beer is of primary significance in the invention.

Filtration of beer in the brewery represents an important procedural step to produce a product in accord with users' expectations. For this at present diatomite and layer filtration are used. These, however, have a disadvantage in that filtration aids requiring disposal are produced to a greater extent. Essentially this applies to used diatomite, the consumption of which comes to about 150,000 tons per annum worldwide. The diatomite sludge to be disposed of has a dry substance content of only about 20 to 25%, so that the quantity of diatomite sludge to be disposed of totals at least four times the above tonnage.

Disposal of diatomite sludge causes major environmental problems. Along with the instability in dumps caused by diatomite sludge, percolating water of diatomite sludge in particular that is released represents a great environmental burden owing to its high BSB* and CSB* values.

*BSB and CSB are measures of biochemical oxygen consumption, and chemical oxygen consumption, respectively.

Quite some time ago efforts were made to find alternatives to the traditional treatment methods. Cross flow technology has already been investigated as an alternative, and achieved acceptance particularly in the area of wines. Until now this technology could not be used successfully in breweries, primarily owing to low specific surface performance and analytic changes of the filtered beer during filtration lasting many hours.

In the field of wine we have a possibility to markedly increase the flux rate in cross flow filtration by heating the wine to be filtered, as is known from DE 34 23 594 A1. If the products are heated to considerably above 35°, performance with the cross flow process can be raised to double what it was. In the area of beer filtration this measure is not possible, since beer must be filtered at temperatures from −1 to +3° C., so that low-temperature-unstable substances such as certain proteins do not go into solution, thus later causing the beer to become cloudy when the consumer sees it.

Because of beer's particular contents, filtration of beer is considerably more difficult than filtration of wines, for example. In addition, beer contains coarse disperse particles such as yeast, or possibly present beer pests, or colloidal components. Primarily we are dealing here with high-molecular-weight compounds of proteins with carbohydrates, tannin and hops resins. Designated as a third component group are molecular disperse components with a particle size <0.001 μm.

According to G. E. Walla (*Cross Flow Microfiltration in Breweries,* dissertation in the Department of Technical Microbiology and Brewery Technology, Munich Technical University, 1992, p. 7), the following requirements exist for beer filtration:

1. That the filtrate have sufficient physico-chemical stability.
2. No bad-tasting product degradation from the filtration process.
3. Biological stability of the filtrate.
4. Sparkle quality and clean filtrate; preservation of $CO_2$ content.

A further requirement has to do with the chemical analysis appearance of the filtrate. This is allowed to be changed by the filtration process only to a trivial extent.

Walla, in the course of his investigations, determined that a trans-membrane pressure can be regarded as optimal (dissertation, p. 66) for beer filtration as regards the components of the filtrate. Filtrate analyses have shown that the original wort content peaks at a trans-membrane pressure of 1.5 bar, as compared to higher or lower trans-membrane pressures.

Proceeding from this knowledge, Walla attempted to raise the flux rates while maintaining a constant trans-membrane pressure of 1.5 bar.

The flux rate is affected by the cover layer being formed on the membrane. Therefore an attempt was made to eliminate this by periodic back-rinsing. However, this procedure has a disadvantage in that as operating duration increases, the flux rate (both at the start and after back-rinsing with filtrate) is lower than in the previous cycle. This can be explained by the fact that certain adsorption effects take place which lead to a membrane blockage to a limited degree.

In addition, Walla determined (dissertation, p. 83) that in spite of periodic back-rinsing, particularly over a number of hours of filtration using the cross flow process, the original wort, the apparent extract, the thickness and foam stability in the filtrates decline. On average the original wort of the filtrate declined by an average of 0.5 weight % without periodic back-rinsing. With periodic back-rinsing the change was still 0.2 weight %. Without periodic back-rinsing the foam value dropped by 21 foam-points; using periodic back-rinsing, the drop was still 6 foam-points.

Another option for achieving larger flux rates consists in increasing overflow velocities (see Walla, Dissertation, page 62ff). From the investigations it can be clearly gleaned, however, that even a high overflow rate over a long period results in no significantly higher flux rate. The average performance after about six hours of filtration, even at a rate of 6 m/sec, amounted to only 35 $L/M^2$ h. The cause of this is that even when higher overflow velocities are employed, buildup of a cover layer on the membrane surface cannot be totally avoided.

Additionally, the cover layer that forms considerably affects the filtration result by formation of a so-called secondary membrane in such a way that the selectivity of the actual membrane becomes greater. This means that even if membranes with a large nominal pore size are used, a cover layer is formed that is far under the nominal pore size of the membrane, so that essential components are removed from the beer.

High flow velocities, however, are to be avoided in beer filtration for the following reasons. First, overflow pumping causes an enormous amount of energy to be transferred into the system, so that unless there is supplemental cooling, beer heats up very rapidly. Through mechanical loading of colloidal substances in beer, particularly glucans, the filtration capacity of beer becomes steadily worse owing to pumping transfer in the cross flow system through gelation of β-glucan.

A procedure is known from DE 39 36 797 C2 for separating beer from a raw material flow transferred during a fermentation process. In this process, ceramic membranes are used, for, in contrast to polymeric ones, ceramic membranes can be sterilized by hot water. These ceramic membranes are rinsed at large time intervals using a chemical cleaning solution, and are back-rinsed using hot water until free of chemicals in numerous intermediate cleaning steps. The cleaning steps are only carried out if a decrease in filtrate flow has taken place as a result of increasing blocking of the ceramic membrane. Also in this process there is a danger that possible essential components of the fluid to be filtered are filtered out by the cover layer, thus impairing the analytical appearance of the filtrate.

From DE 39 14 956 A1 is known a process for accelerating material exchange of a continuous bioreactor. In this process, using pressure modulations, formation of a secondary layer on the filtration membrane is prevented. Pressure changes are controlled depending on the pressure difference measured over the membrane. These changes must be oriented to providing the systems produced with fluid and nutrients.

What is recommended in *Weinwirtschaft-Technik*, 1990, pp. 15–21, is that in every case where the residue temperature increases too much, or filtration performance declines too much, that cross flow filtration be interrupted and a cleaning cycle be undertaken.

The object of the invention is to make available a procedure and a device for filtration by means of MF modules, making possible a high average flux rate with little mechanical and thermal loading of the fluid to be filtered. The filtrate is not to be affected in its analytical appearance by the filtration.

The object is achieved with a procedure in accord with the characteristics of patent claim 1. The subject of the device is patent claim 14. Advantageous embodiments are the subjects of the subordinate claims.

The invention proceeds from the recognition that it does not make sense to conduct filtration while keeping constant the trans-membrane pressure that is optimal for the particular fluid, to attain equally high flux rates as well as outstanding filtrate quality.

Correspondingly, each filtration cycle is begun with a low trans-membrane pressure. During the filtration cycle this steadily increases up to a particular pre-set value, preferably matching the optimal trans-membrane pressure for the particular fluid. For beer, therefore, most advantageously this is a value of 1 to 2 bar, preferably 1.5 bar.

Toward the end of the filtration cycle, when the trans-membrane pressure is nearing the pre-set trans-membrane pressure, the flux rate also drops more or less steeply, owing to the cover layer that inevitably will form. This nonetheless is always relatively high, over 50% of the maximum value as a rule.

Filtration is preferably carried out as cross flow filtration. Static filtration, such as when CMF modules are used, is likewise possible.

Despite the still high flux rate, a cleansing cycle is carried out preferably including an alkaline cleansing using NaOH, KOH and/or tenside-containing cleansing agents. After that, rinsing with water must also be conducted.

Preferably prior to the alkaline cleansing, a back-rinsing takes place with water. In this regard it is recommended that prior to water back-rinsing the fluid to be filtered should be forced out of the MF modules using $CO_2$ compressed gas. $N_2$ compressed gas can also be used in place of $CO_2$.

To accelerate the cleansing process, preferably during the cleansing cycle an overflow of the MF module is carried out.

Depending on the type of fluid to be filtered, particularly with beer, prior to filtration a pre-filtration can be carried out using MF modules, preferably by means of a separator or a matting filter.

By the invention-specific discontinuous filtration process, the cover layer being formed is almost totally eliminated by alkaline high-speed cleansing, so that during filtration only the nominal membrane pore diameter operates as the actual interface. The beer ingredients that preserve quality can thus penetrate the membrane without difficulty.

If the process is used for beer filtration, the filtration procedure, preferably a CMF* filtration procedure, is interrupted after filtration times of 1 to 4 hours. $CO_2$ is used to force the beer from the CMF facility. The facility is subjected to a water pre-rinse, and then an alkaline intermediate cleansing is conducted at temperatures of 40–90° C. Following the alkaline cleansing process, the facility is rinsed with water. This is likewise forced out of the facility by $CO_2$; then the facility is again filled with beer. This procedure makes it possible to take advantage cyclically of the high flux performance during the first filtration phase that is typical for CMF technology. If we use cyclic cleansing after 1 to 4 hours, then despite interruptions of filtration flux, rates are achieved which are close to 100% above the previously achieved flux rates with a continuous CMF filtration process.

*Crossflow microfiltration

Only 20 to 30 $L/m^2$ on average were achieved in a continuous CMF filtration process with filtration times of up to 8 hours with no interruptions. In contrast, with the new type of procedure, flux performances of up to 100 $l/m^2$ were attained, and this with the same duration.

It is surprising that the high flux rates were also achieved with a low overflow speed. Preferably the overflow rates are <2.5 m/s. The advantage of low overflow rates, which also includes static operation of the MF modules, is that the fluid to be filtered is only slightly loaded mechanically and thermally.

Additionally, it was surprising that the analytical appearance of the beer did not change. In particular, one analytical feature of the beer, namely the original wort, is not affected. The analysis values of the filtered beer do not differ from the unfiltered products. Also the foam stability of the beer was not negatively affected by the discontinuous MF process.

The device that is provided with all current filtration module types, particularly cross flow module types, preferably with capillary planar modules, possesses a measuring instrument for determining trans-membrane pressure. Additionally, the MF filtration device has a control element to which the instrument for measuring trans-membrane pressure is attached.

In each instance where the pre-set trans-membrane pressure is attained, the control device interrupts filtration and sets into operation a cleansing device with a pre-set cleansing program. Following conclusion of the cleansing cycle, filtration is continued by the control device. Most appropriately the control device regulates the appropriate valves in the lines of the MF filtration device.

The control device is preferably configured to input a pre-set trans-membrane pressure, so that in each case the optimal trans-membrane pressure for the particular fluid to be filtered can be pre-set.

The MF modules preferably possess membranes with a nominal pore size of 0.2 to 5 $\mu$m. Polymer membranes are preferably used as membranes. Use of polymeric or metallic fleeces is likewise possible. Exemplary embodiments of the invention are explained in what follows with the aid of diagrams.

Shown are:

FIG. 1 a schematic depiction of the filtration device.

Figure 2:
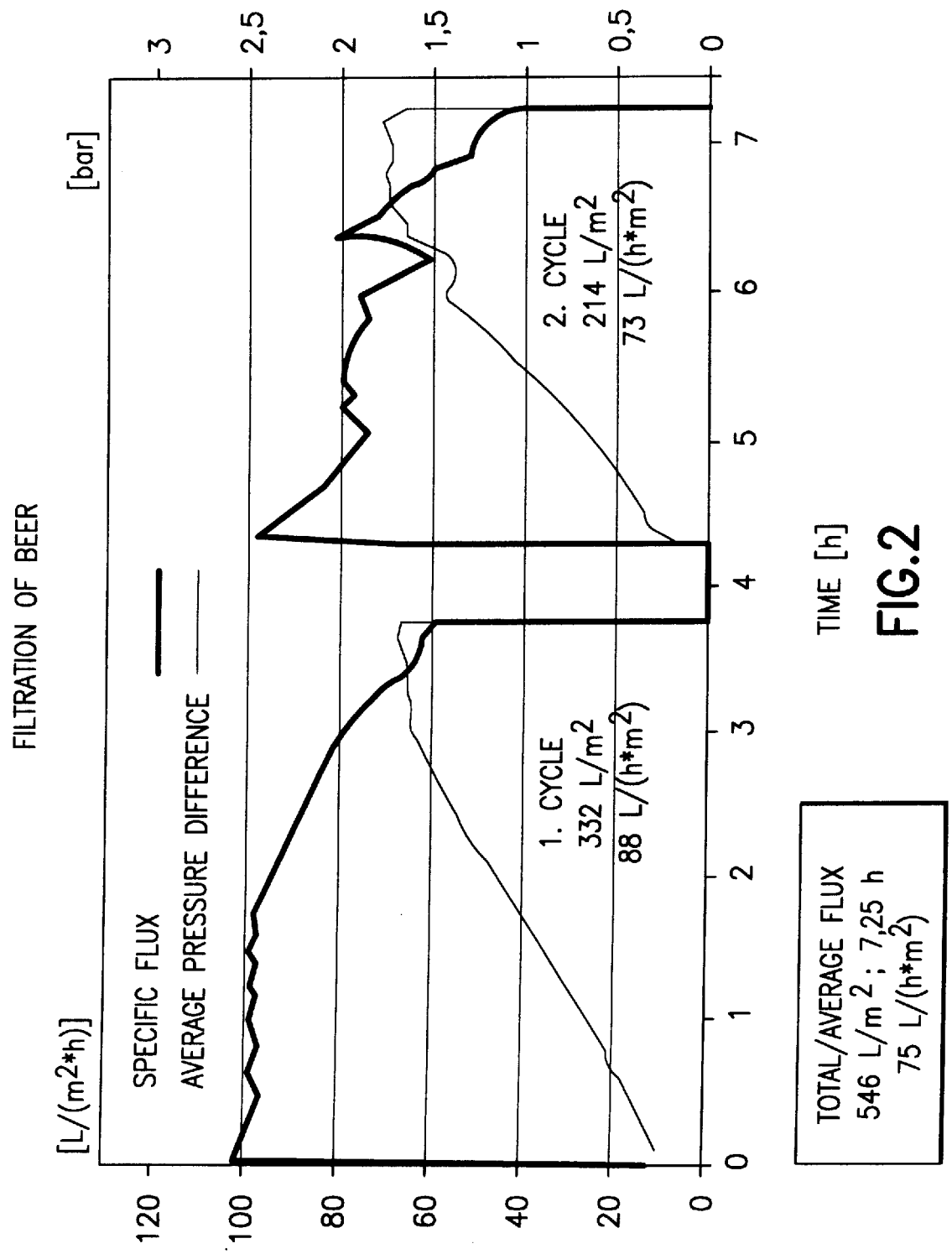

FIG. 2 a diagram in which the flux rate and the trans-membrane pressure are presented in dependence on time for a beer A.

Figure 3:
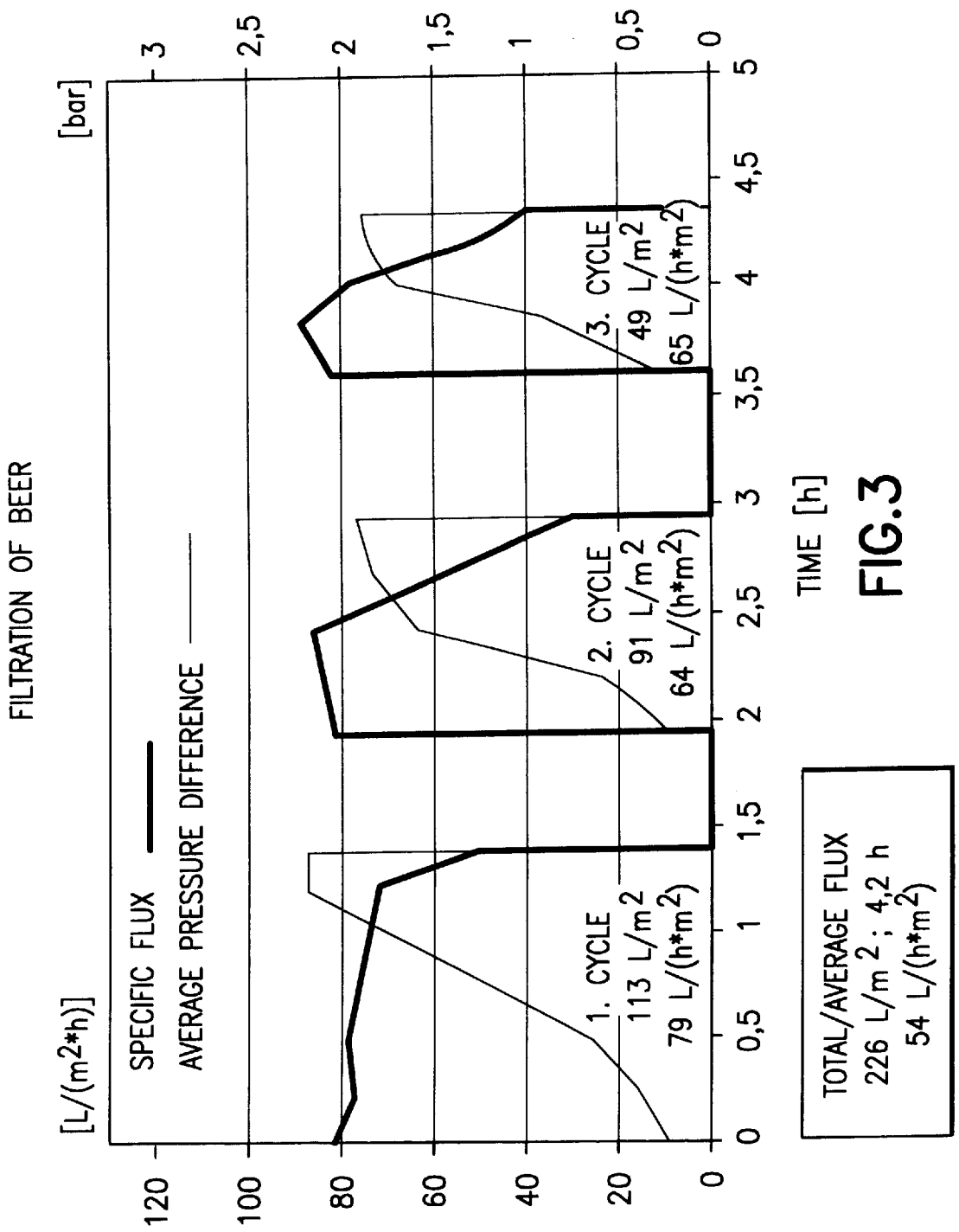

FIG. 3 a diagram corresponding to FIG. 2 for a beer B

FIG. 4 a diagram corresponding to FIG. 2 for a beer C.

FIG. 1 depicts a microfiltration device which exhibits a collection tank 1, from which, via a feed pump 2 and two circulating pumps 4 in the feed line 13, the beer to be filtered is directed to multiple parallel-switched MF modules 5.

The concentrate remains in the device, or is drained off via a concentrate line, and the filtrate is collected in a filtrate line 15 which can be closed by a valve. By optional operation of the circulation pumps 4, both static and dynamic filtration, i.e., cross-flow filtration, is possible. A known type of analyzer 24 can be connected to the filtrate line 15 to provide a n analysis of the filtered beer, such analysis including coloration, pH value, bitterness value, FAN mg/l, visible extract %, actual extract %, alcohol by weight, alcohol by volume, original wort %, visible degree of clarification, actual degree of clarification, caloric values, foaming and nitrogen oxide content. The microfiltration device also exhibits a cleansing facility, which essentially exhibits a cleansing container 6 for takeup of the chemical cleanser and back-rinse water. This cleansing container 6 is connected via a cleansing line 16 and a water line 18 to the feed line 13. After valve 9 is opened, the chemical cleanser can be fed into feed pump 2 and thus be delivered to MF module 5.

Additionally, the facility is equipped with pressure measurement devices 3. The pressures in the non-filtrate and filtrate space are continuously determined and passed to a control device 7. This control device continuously calculates trans-membrane pressure from the individual values, and compares it with the pre-set value.

Upon attaining the pre-set trans-membrane pressure, the control device 7 interrupts filtration and starts the cleansing cycle. For this purpose, the control device is connected with valves 8–12, 19–22 and pumps 2, 4 (connection not shown). If filtration is interrupted, first valve 8 is closed and valve 20 is opened to empty out the device.

After the device has been compressed dry, valves 12, 20 and 19 are closed, and valves 21, 11 and 22 are opened. After feed pump 2 is started, the MF modules 5 are rinsed with water in a direction reverse to that of the filtration direction. Next comes the chemical cleansing of the device. For this, valves 22, 21 and 11 are closed, and valves 19, 9 and 10 are opened.

For completion of the chemical cleaning, the cleansing fluid is forced out of the device after closure of valve 9 and opening of valve 11. Water is removed from the device after closing of valve 11 and opening of valve 20. Following completion of the cleansing cycle, valves 20 and 10 are closed, and also valves 8 and 12 are again opened.

The following trials were carried out using the filtration device just described.

The filtration device was equipped with a total of four filtration modules containing permanently hydrophilic membranes with a pore size of 0.45 μm. The overall membrane surface totaled 20.0 m². The overflow velocity amounted to 2.5 m/s.

The pre-set trans-membrane pressure was set at 1.7 bar, and two filtration cycles were carried out within 7.5 hours, interrupted by a cleansing cycle of about ½ hour. The result is depicted in FIG. 2, showing the flux rate and the trans-membrane pressure in dependence on time.

The trans-membrane pressure starts at about 0.25 bar and then rises to the pre-set trans-membrane pressure of about 1.7 bar. As soon as this trans-membrane pressure is reached, the filtration process is shut off and the cleansing cycle is carried out. As can be gleaned from FIG. 2, the flux rate at the start of the second filtration cycle is just as high as at the start of the first filtration cycle. During the first cycle, the flux rate is constant over a 2-hour period, and only then does it drop. At the end of the first filtration cycle, the flux rate is still 60% of the initial value. In the second filtration cycle, the flux rate is already dropping after one hour, but is then kept constant over a period of about 1.5 hours. The average flux rate in this example is 75 l/m²h.

The analysis values are summarized in the following table.

TABLE

|  | I | II | III | PRIOR ART IV |
|---|---|---|---|---|
| EBC color* | 6.0 | 6.1 | 6.0 | 5.7 |
| pH | 4.20 | 4.21 | 4.19 | 4.21 |
| EBC bitterness value | 32 | 32 | 32 | 32 |
| FAN mg/l** | 88 | 101 | 92 | 101 |
| Visible extract % | 1.52 | 1.52 | 1.52 | 1.51 |
| Actual extract % | 3.35 | 3.35 | 3.37 | 3.35 |
| Alcohol wt. –% | 4.00 | 4.00 | 4.07 | 4.04 |
| Alcohol vol. % | 5.08 | 5.08 | 5.17 | 5.13 |
| *European Brewery Convention | | | | |
| **alpha-Amin-Nitrogen | | | | |
| Original wort % | 11.18 | 11.19 | 11.30 | 11.17 |
| Visible degree of clarification, % | 86.41 | 86.42 | 86.55 | 86.49 |
| Actual degree of clarification, % | 70.07 | 70.06 | 70.17 | 70.11 |
| Caloric value, kcal/100 g | 41 | 41 | 42 | 42 |
| Caloric value kJ/100 g | 173 | 173 | 176 | 174 |
| Foam as per NIBEM* sec | 290 | 310 | 315 | 270 |
| Nitrogen Oxide mg/l | 7 | 8 | 8 | 8 |

*Niederlandisches Institut fur Brauerei und Maize-rei
I Centrifuge outlet
II Cross flow outlet
III Cross flow outlet (2nd filtration cycle)
IV State of the art/outlet layers An additional pre-filtration using a centrifuge (not depicted in FIG. 1) was carried out. Therefore, in column 1 the analysis values are presented at the outlet of the centrifuge, which thus represent the non-filtrate for CMF filtration. Column II contains the analysis values after the first filtration cycle and in column III, after the second filtration cycle. For comparison, in column IV the analysis values are summarized according to traditional filtration with a layered filter.

From a comparison of the numerical values it can be see that such values as EBC color are better than after state-of-the-art filtration. The original wort content did not change relative to the content in the non-filtrate. The foam values are considerably higher as compared to column IV, and are likewise comparable with the non-filtrate value.

FIG. 3 depicts a diagram with three filtration cycles. Here, filtration was carried out with another type of beer, Pils Beer. Here the average flux rate was 54 l/m²h. The analysis values after the filtration cycles were comparable with the ones from the table. The same is also true for FIG. 4, in which the flux rates and trans-membrane pressure for a third beer filtration trial are depicted.

Reference designators:

| | |
|---|---|
| 1 | Non-filtrate |
| 2 | Feed pump |
| 3 | Measuring device |
| 4 | Circulation pump |
| 5 | MF modules |
| 6 | Cleanser holder |
| 7 | Control device |
| 8 | Valve for non-filtrate feed line |
| 9 | Valve for cleansing fluid |
| 10 | Valve for filtrate-side outflow |
| 11 | Water valve |
| 12 | Filtrate valve |
| 13 | Feed line |
| 14 | Concentrate line |
| 15 | Filtrate line |
| 16 | Cleansing line |
| 17 | Compressed gas line |
| 18 | Water line |
| 19 | Valve for concentrate space feed |
| 20 | Valve for compressed gas |
| 21 | Valve for filtrate space feed |
| 22 | Valve for concentrate-side outflow |

What is claimed is:

1. Microfiltration device for a fluid filtration process, said microfiltration device having a plurality of microfiltration modules arrayed in parallel rows, having a device for cleansing the microfiltration modules, having a measuring device for recording trans-membrane fluid pressures, and having an analyzer, the analyzer being located and operable for analyzing filtered fluid for one or more of the following components; color, apparent extract, bitterness, pH and alcoholic content of the fluid, characterized in that the analyzer is attached to a control device which is operable to interrupt the filtration process upon the measuring device recording a predetermined trans-membrane pressure which exceeds a value that is determined as optimal based on the analyzer's measurements after the fluid has passed through said microfiltration modules, and thereafter discontinue said fluid filtration process and activate a chemical cleansing process.

2. Device according to claim 1, characterized in that said analyzer measures the bitterness of the fluid, in units of International Bitterness Units, which relates to the weight of iso-alpha acid per U.S. gallon of fluid.

3. Microfiltration device for a fluid filtration process, said microfiltration device having a plurality of microfiltration modules arrayed in parallel rows, having a device for cleansing the microfiltration modules, and having a measuring device for recording the trans-membrane fluid pressures, and having an analyzer, the analyzer being located and operable for analyzing filtered fluid for one or more of the following components; color, apparent extract, bitterness, pH and alcohol content of the fluid, characterized in that the analyzer is attached to a control device which is operable to interrupt the filtration process upon the measuring device recording a predetermined trans-membrane pressure which exceeds a value that is determined as optimal based on the analyzer's measurements after the fluid has passed through said microfiltration modules, and thereafter discontinue said fluid filtration process and activate a chemical cleansing cycle.

* * * * *